Dec. 23, 1924.

G. C. HOSCH ET AL 1,520,471

FABRIC MEASURING AND COST COMPUTING MACHINE

Filed June 8, 1922  3 Sheets-Sheet 1

Inventors:
G. Carlton Hosch.
John L. Wheeler.
By Elliott & Ammen
Attorneys.

Dec. 23, 1924.

G. C. HOSCH ET AL 1,520,471

FABRIC MEASURING AND COST COMPUTING MACHINE

Filed June 8, 1922      3 Sheets-Sheet 2

Inventors:
G. Carlton Hosch,
John L. Wheeler.
By Elliott & Ammen
Attorneys

Dec. 23, 1924.
G. C. HOSCH ET AL
1,520,471
FABRIC MEASURING AND COST COMPUTING MACHINE
Filed June 8, 1922
3 Sheets-Sheet 3
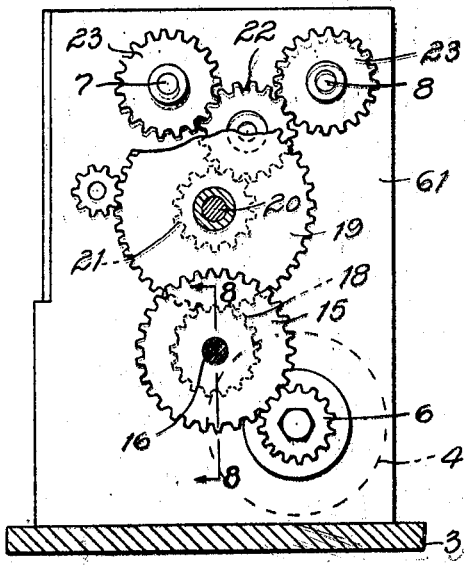
Fig. 5
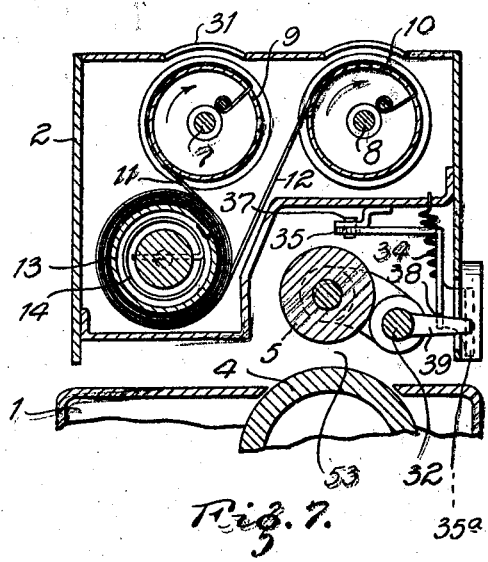
Fig. 7
Fig. 9
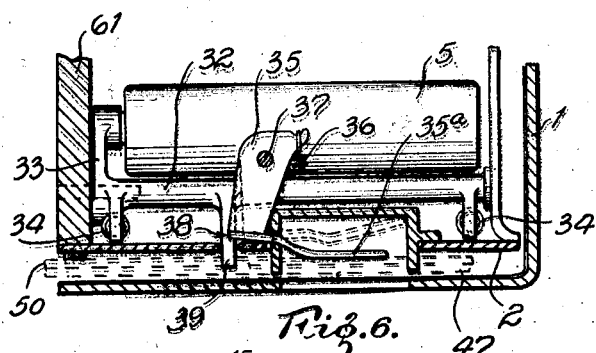
Fig. 6
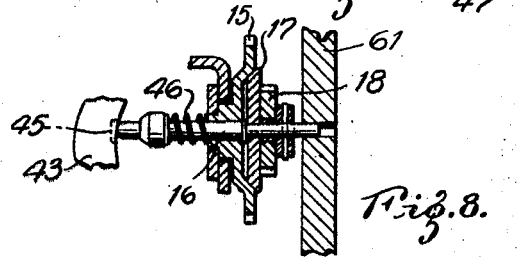
Fig. 8
Inventors
G. Carlton Hosch,
John L. Wheeler.
By Elliott & Aumein
Attorneys Patented Dec. 23, 1924.

1,520,471

UNITED STATES PATENT OFFICE.

G. CARLTON HOSCH AND JOHN L. WHEELER, OF ST. LOUIS, MISSOURI, ASSIGNORS TO THE MEASUREGRAPH COMPANY, OF ST. LOUIS, MISSOURI, A CORPORATION OF DELAWARE.

FABRIC MEASURING AND COST COMPUTING MACHINE.

Application filed June 8, 1922. Serial No. 566,690.

*To all whom it may concern:*

Be it known that we, G. CARLTON HOSCH and JOHN L. WHEELER, citizens of the United States, residing in the city of St. Louis and State of Missouri, have invented new and useful Improvements in Fabric Measuring and Cost Computing Machines, of which the following is a specification.

This invention relates to indicating or measuring machines and while features of the invention are applicable to different types of such machines, in the present specification, we have described the invention as applied to a fabric measuring and cost computing machine.

The general object of the invention is to provide an indicating machine with means, operating as a bar to prevent a careless operator from commencing a second measurement or indication before the indicating mechanism has been reset to its zero position. As applied to a fabric measuring and cost computing machine, a further object of the invention is to provide simple means for controlling the bar through the medium of the marking means whereby the fabric is marked to indicate the length measured; and to provide means whereby the fabric may be notched or marked at the point where the measurement begins as well as at the point where the measurement ends.

A further object of the invention is to provide automatic means for throwing the bar into its inactive or withdrawn position when the indicating mechanism has been returned to zero; also to provide means operable at will for rendering the bar inoperative to enable a number of remnants to be measured in succession without necessitating the resetting of the machine to zero after each measurement.

Further objects of the invention will appear hereinafter.

The invention consists in the novel features, and in the general combination of parts to be particularly described hereinafter, all of which contribute to produce a simple and efficient fabric measuring and cost computing machine. A preferred embodiment of our invention will be particularly described in the following specification, while the broad scope of our invention will be pointed out in the appended claims.

In the drawing—

Figure 5 is a view in the nature of a vertical section particularly illustrating the means for driving the indicating mechanism;

Figure 6 is a horizontal section taken through the right hand portion of the machine at about the level of the line 6—6 on Figure 3 and particularly illustrating the presser roller and presser roller frame and the latch for holding the same raised away from the measuring roller;

Figure 7 is a vertical section taken about on the line 7—7 of Figure 2 and particularly illustrating the means for supporting the indicating charts and the means for returning the same and the indicating pointers to the zero position;

Figure 8 is a vertical section taken about on the line 8—8 of Figure 5 and particularly illustrating the clutch through which the gear train is driven in order to drive the indicating mechanism.

Figure 9 is a detail view and is a section on the line 9—9 of Figure 3.

Figure 1:
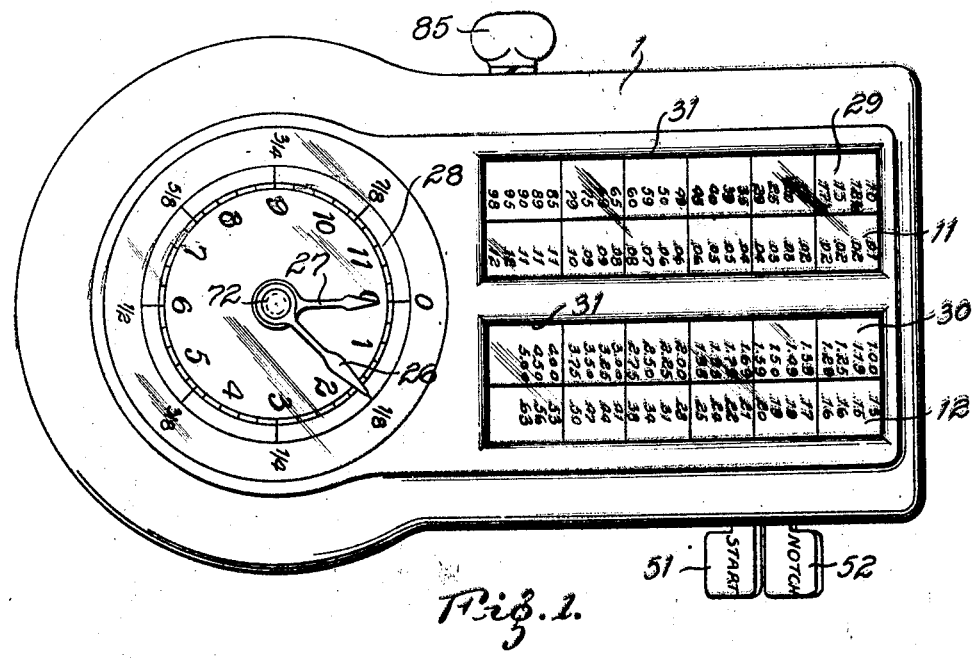
Figure 1 is a plan of a fabric measuring and cost computing machine embodying our invention.

In the drawing, 1 represents the casing of the machine which incloses the mechanism of the machine which is mounted upon a frame 2 which is supported on a base plate 3.

In measuring fabric with this machine the fabric is pulled between the measuring roller 4 and a presser roller 5 (see Figures 6 and 7) the rotation of the measuring roller 4 being imparted by a pinion 6 (see Figure 5) through a gear train to two roller shafts 7 and 8. These shafts carry rigidly two take up rollers 9 and 10, which wind up two charts 11 and 12, said charts being normally wound upon a supply drum or roller 13 provided with means for maintaining tension in the charts. For this purpose, there is provided a coil spring 14 disposed within the drum (see Figure 7). This spring not only maintains the charts' tension but also returns the indicating mechanism including the charts to zero in the zero-setting movement. The gear train between the pinion 6 and the shafts 7 and 8 includes a gear 15 meshing with the pinion 6 and carried on a clutch shaft 16 (see Figure 8). This gear constitutes a clutch member co-operating with the relatively movable clutch member 17 carrying a pinion 18 which in turn meshes with a large gear 19 on the main horizontal spindle 20 of the machine; the inner end of this spindle 20 carries a pinion 21 (Figs. 2 and 5) which meshes with the outer member of the duplex idle gear 22 comprising two similar gears secured on opposite ends of a short sleeve, (Fig. 2), the inner member of the duplex gear meshing with the two gear wheels 23 that are carried upon the aforesaid shafts 7 and 8.

The outer end of the horizontal spindle 20 carries a beveled gear 24 (see Figures 3 and 4) which meshes with a beveled gear 25, and through a suitable reduction gear 26 illustrated in co-pending application, Serial No. 425,646; the beveled gear 25 drives two pointers 26 and 27 the former of which is a fast moving pointer and moves at the same speed as the beveled gear 25, the other pointer 27 being a slow moving pointer and being driven through the agency of the reduction gear 26.

The indicating mechanism includes also a dial 28 which co-operates with the pointers 26 and 27 to indicate up to 12 yards, co-operating with the pointer 27; and also includes fractional indications which represent fractions of a yard to co-operate with the fast moving pointer 26. On the charts 11 and 12 computed figures are provided which are disposed in alignment with numbers on two scales 29 and 30 which are visible in two windows 31 which are formed in the upper side of the casing (see Figure 1). The numbers on the scales 29 and 30 indicate different price rates per yard and the computed figures on the charts indicate the charge to be made for the amount indicated on the dial at the different price rates shown on the scale.

The presser roller 5 is supported in a presser roller frame 32 (see Figure 6) and this frame is in the form of a shaft or arbor supporting the presser roller. Coil springs 34 attached to the frame operate to hold the presser roller depressed and against the upper face of the measuring roller.

Machines of this type are usually provided with a latch such as the latch 35 bent at right angles (see Figures 3, 6 and 7) which is actuated by a spring 36 so as to rock upon its pivot support 37 so that a notch or shoulder 38 on its lower end as seen in Fig. 7 may project over an arm 39 which extends laterally from the presser roller frame. In this way, the latch operates to hold the presser roller raised in order to permit the fabric to be inserted between the rollers before beginning a measuring movement.

With machines of this type, it has been customary in the past merely to measure the fabric and then mark the edge of the same at the end of the measurement so as to indicate where the fabric is to be cut off. As a check upon the machine and in order to indicate on the fabric sold, exactly where the measurement began and where it ended, we provide means for marking the fabric at the point where the measurement begins as well as at the point where the measurement ends.

In order to accomplish this, we provide a hand-operated member for actuating the marking device before the measurement is made and a second hand-operated member for actuating the marking device after the measurement is made.

In order to prevent any possibility of the machine not being returned to zero after a measurement has been made, we provide a bar for obstructing the machine to prevent use of the same. We control this bar by the operation of the second hand-operated member so that after a measurement has been made the machine cannot be used to make another measurement until the indicating mechanism has been returned to zero.

Figure 2:
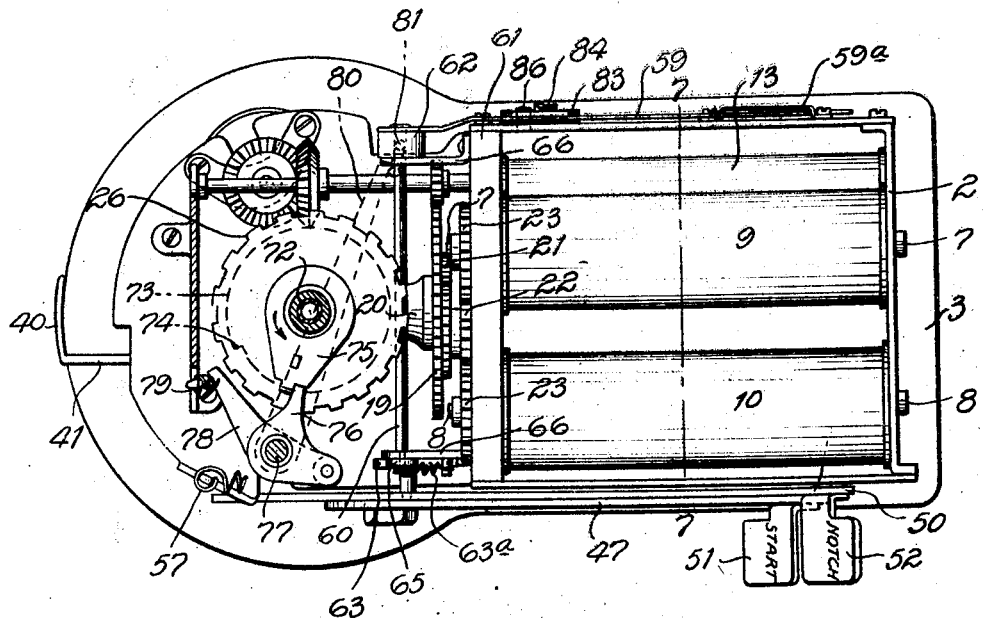
Figure 2 is a horizontal section taken through the upper part of this machine about on the line 2—2 of Figure 3, the casing being removed; in this view the section line only passes through parts of the machine at the left hand end of the same.
Figure 4:
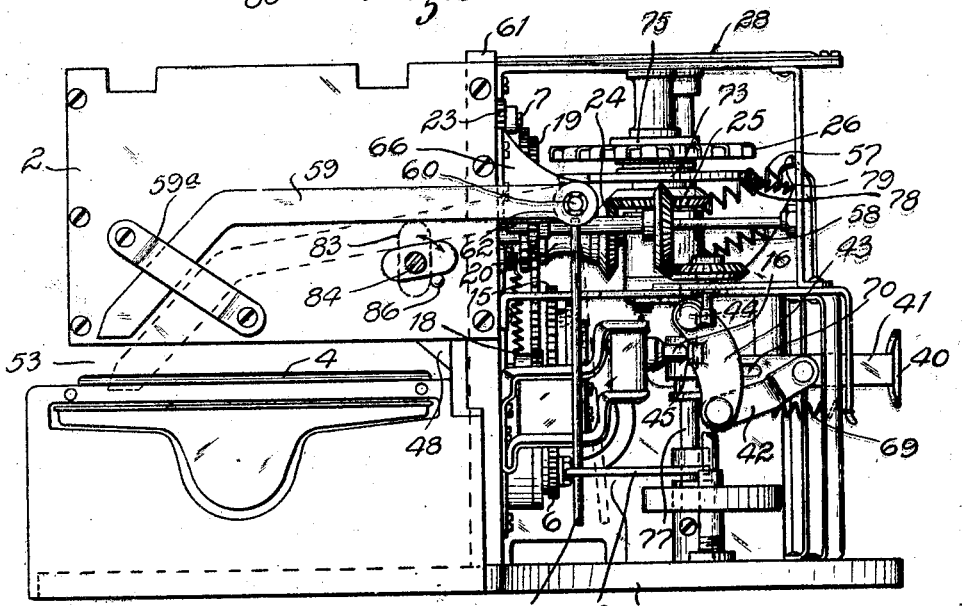
Figure 4 is a side elevation showing the rear side of the machine without the casing.

The zero-setting movement is accomplished by actuating a hand-operated re-setting button 40 (see Figures 2, 4 and 8). This re-setting button is carried on a flat stem 41 which actuates a link 42 (see Figure 4) and this link actuates an arm 43 pivotally supported at 44 on the frame 2. The arm 43 has a finger 45 which engages the clutch stem 16 (see Figure 8) and when the re-setting button 40 is actuated, it shifts this stem toward the right as viewed in Figure 8, compressing the coil spring 46 and opening the clutch composed of the parts 15 and 17. The spring 14 shown in Figure 7 then returns the indicating mechanism to zero.

In order to effect the marking or notching of the fabric before and after making a measurement, we provide a hand-operated lever 47 (see Figure 3) and this lever is mounted so that when actuated it will operate a marking device; in the present instance, this marking device comprises a movable blade 48 and a fixed blade 49 arranged like a shear. The movable blade 48 is preferably secured to a second hand-operated lever 50. These levers 47 and 50 have thumb plates 51 and 52 which are disposed on the outer side of the casing 1 so as to enable the levers to be operated.

The machine is constructed with a gap 53 (see Figure 3) through which the fabric is pulled during the measuring movement. During this movement, the shaft of the measuring roller 4 actuates the indicating mechanism in the usual manner. The lever 50 which is operated after the measuring movement, is provided with means for raising the presser roller so as to enable its latch 35 to hold the same raised. For this purpose the lever 50 is provided with a cam-edge 54 into the path of which the arm 39 extends so that when the lever 50 is depressed the arm 39 will be depressed, at least, until the shoulder 38 (Fig. 7) engages it and holds the presser roller raised. As soon as the fabric has been put in position, the operator of the machine releases the latch 35 by pressing in against the thumb lever 35ᵃ which extends horizontally from the body of the latch and which is reached through an opening in the casing 1, causing the latch to turn on its pivot 17.

When the lever 47 is used to effect the marking of the fabric before beginning the operation, it operates to actuate the lever 50 so as to operate the blade 48 and effect the marking of the fabric but it operates to leave the presser roller 5 in its depressed position against the fabric on the measuring roller 4. In order to accomplish this, we simply provide the lever 47 with a projecting cam tongue 55 (see Figs. 3 and 9). As the lever descends, this tongue strikes the thumb lever 35ᵃ on its outer side and keeps the latch 35 in its withdrawn position, shown by dotted lines in Fig. 6, so that it cannot snap over the arm 39. Hence, although the lever 50 may be depressed and may operate to raise the presser roller, the cam 55 operates to prevent the latch from holding arm 39 down and hence, as the levers 50 and 47 rise to their normal position, the presser roller is returned by its springs 34 to its depressed position. In order to enable the lever 47 to actuate the lever 50, a projection is provided on the lever 50 which extends into the path of the lower edge of the lever 47; this projection may be in the form of a pin 56 (see Figure 3). It should be understood that the lever 50 is movable independently of the lever 47 however, and when the lever 50 is actuated it extends its own return spring 57. At such time the lever 47 is held up by its own return spring 58.

The bar referred to above consists of a flat arm or bar 59 which is movably supported on the frame 2 and normally held in a withdrawn position so that it does not obstruct the path of the fabric through the gap 53. In order to accomplish this the bar is attached to one end of a horizontal shaft 60 (see Figures 2 to 4); this shaft extends across the machine and parallel with a vertical frame plate 61. The bar 59 is rigidly attached to a rotary head 62 on the rear end of the shaft 60. The bar 59 tends by gravity to fall down into the position in which it is indicated in dotted lines in Figure 4 thereby obstructing the path of the fabric through the gap 53. We provide means for normally holding the bar raised and in its withdrawn position, and this means preferably includes a detent pawl 63 (see Figures 2 and 3) which is actuated by a spring 63ᵃ so that its end normally engages a shoulder 64 on a collar 65 which is rigidly secured to the shaft 60 (see Figure 2). This pawl is pivotally supported on one of the supporting brackets 66 for the shaft 60 and has a tail 67 (Fig. 3) which projects into the path of a pin 68 which projects from the inner face of the lever 50. When the lever 50 is depressed this pin 68 actuates the pawl so as to release it from the collar 65 and the bar 59 then falls by gravity into its active or advanced position.

A suitable guide 59ᵃ may be attached to the frame 2 so as to guide the outer end of the bar (see Figure 4).

Figure 3:
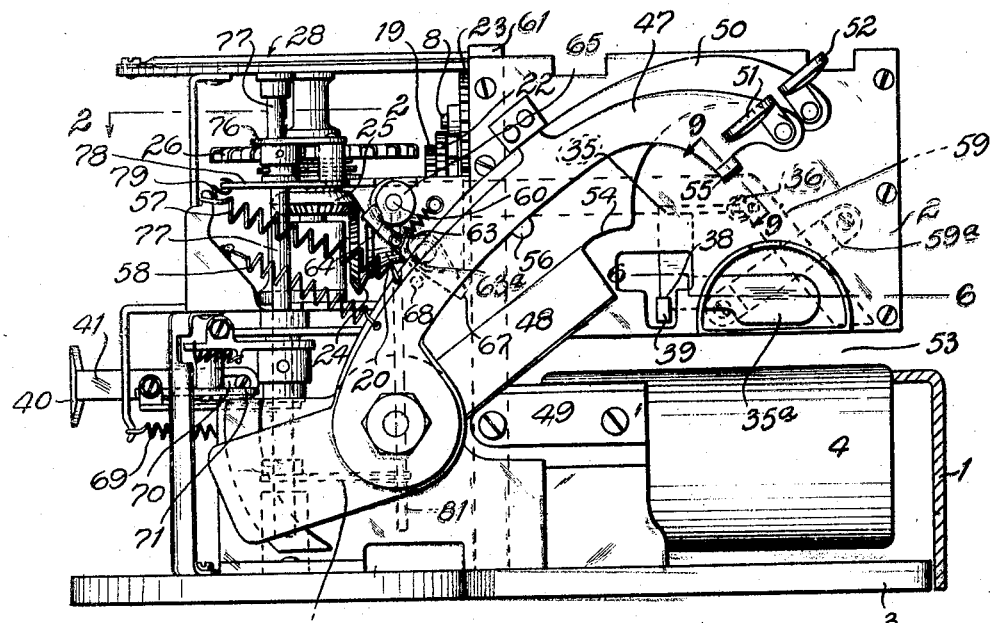
Figure 3 is a front elevation of the machine with the principal part of the casing removed but showing part of the lower portion of the casing in cross-section.

After the re-setting button 40 has been shoved in to effect the re-setting of the indicating mechanism to zero, it is returned by a coil spring 69 (see Figures 3 and 4). In its movement the flat stem 41 is guided by means of a longitudinal slot 70 with which co-operates a fixed guide screw 71.

The slow moving pointer 27 is rigid with a large tubular shaft 72 (see Figure 2), and this tubular shaft carries rigidly a controller wheel 73 which is simply a disc with a notch 74 in its edge; the shaft 72 also carries an arm 75 and when the indicating mechanism is arriving at the zero position the end of this arm engages a dog 76 which projects into its path, and which is mounted on a vertical rock shaft 77; rigid with this dog 76 there is provided a stop pawl or finger 78, the end of which is normally held away from the edge of the disc 73 by means of a coil spring 79. When the indicating mechanism arrives at zero the arm 75 is moving in the direction indicated by the arrow in Figure 2 and when the arm strikes the dog 76 it rocks the pawl 78 inwardly and into the notch 74, thereby stopping the indicating mechanism in the zero position. Figure 2 shows the arm 75 just in contact with the dog 76 so that after a slight further movement, the pointers 26 and 27 will be stopped at zero.

The automatic means which we provide for withdrawing the bar 59 from the path of the fabric, and which is controlled by the indicating mechanism, will now be described. For this purpose we provide the lower portion of the rock shaft 77 with an arm 80 (Figures 2 and 3) which extends across to a point below the rotary head 62 to which the bar 59 is attached; and this arm 80 engages the lower end of a stem 81 (Figures 3 and 4) which extends down substantially vertically from the rotary head 62. With this organization of parts it will be evident that when the indicating mechanism arrives at the zero position, the arm 80 will engage the stem 81 and rock the rotary head 62 in a direction which will lift the bar 59 away from the gap 53; when the rotation of the shaft 60 has been sufficient to accomplish this the detent pawl 63 will snap over the shoulder 64 (Figure 3) and hold the bar 59 in its normal or withdrawn position.

If desired, the machine may be used for measuring a succession of remnants, but after each measurement is made, it is of course, necessary to operate the lever 50 so as to raise the presser roller 5 to enable the next remnant to be positioned in the machine for starting its measurement. This movement of the lever 50 would of course, effect the dropping of the bar 59 across the gap 53. If the machine were then operated to set it back to zero, the bar 59 would be automatically raised to its inactive position. However, we provide hand-operated means for rendering the bar 59 inoperative so that the succession of remnants may be measured without setting back the indicating mechanism to zero. This effects accumulative adding where the prices of the remnants are the same, and is a most desirable operation.

Figure 10:
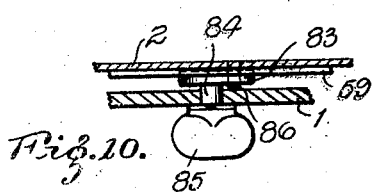
Figure 10 is a horizontal section showing a portion of the casing and illustrating details of the hand-operated means for rendering the bar inoperative at will.

In order to accomplish this, we simply place an elongated button or cam 83 adjacent to the underside of the bar 59, and in a position to engage its lower edge (Figures 4 and 10). This button is carried on a shank or rotatable stud 84 mounted in the wall of the casing and operable from the exterior by means of a thumb head 85. On the side of the frame 2, a stop pin 86 is provided. By rotating the button or cam 83 into the vertical position in which it is shown in dotted lines in Figure 4, its upper edge will lift the bar 59 to its inactive position and will prevent it from dropping into the gap 53 when the lever 50 is operated. The stop pin 86 also enables the button to be held in the position in which it is shown in full lines in Figure 4 at which time it does not interfere in any way with the regular operation of the bar 59.

We will now describe the general mode of operation of the entire machine. When the presser roller 5 is in its elevated position the operator introduces the fabric between it and the measuring roller 4. By shoving in on a thumb lever 35ᵃ the latch 35 will release the arm 39 of the presser roller frame 32 from under the notch 38 and the presser roller will then be depressed against the fabric and hold it against the upper face of the measuring roller.

However, before the presser roller should be depressed in this way, the forward edge of the fabric should be substantially aligned with the blade 49. After the presser roller has been depressed the operator then actuates the thumb plate 51 so as to operate the lever 47. Through the medium of the pin 56 this lever operates the lever 50 which carries the blade 48 which co-operates with the blade 49 to notch the edge of the fabric. As the lever 50 descends, its cam edge 54 engages the arm 39 of the presser roller frame and raises the presser roller, but the cam 55 on the lever 47 operates to engage the outside of the thumb lever 35ᵃ, and keeps the latch 35 of the presser roller frame from holding arm 39 down; in other words, this cam operates as means to inhibit the operation of the latch and hence, when the levers return to their normal elevated position the presser roller will be left resting against the fabric and the measuring roller.

The operator then pulls the fabric through the machine and the measuring roller shaft operates to drive the indicating mechanism.

After the measurement has been made, the operator actuates the lever 50 depressing the thumb plate 52. This actuates the blade 48 so as to mark the edge of the fabric at the point where it is to be cut off. At the same time the downward movement of this lever operates through the cam edge 54 to engage the arm 39 and rock the presser roller frame to its raised position, the latch 35 by means of spring 36 operating to snap over the upper edge of the arm 39 and hold the presser roller up. The depression of this lever 50 also operates through the pin 68 (Fig. 3) to release the detent pawl 63, whereupon the bar 59 descends by gravity into the position in which it is indicated in dotted lines in Figure 4. In this position it operates as a bar or guard across the path of the fabric and prevents the machine from being used. The bar will stay in this depressed and inactive position until the indicating mechanism is re-set to zero by pressing in on the thumb head 40 (Fig. 4). This movement of the thumb head opens the clutch consisting of the clutch members 15 and 17, (Fig. 8) and the spring 14 (Fig. 7) then operates to return the indicating mechanism to zero. As soon as the indicating mechanism arrives at zero, the arm 75 (Fig. 2) actuates the dog 76 fast on shaft 77 and rocks the stop finger 78 into the notch 74, and this stops the indicating mechanism at zero. At the same time, the incidental rocking movement of the vertical rock shaft 77 operates through the arm 80 and the stem 81 (see Figures 2 and 4), to raise the bar 59 to its normal withdrawn position in which it is shown in full lines in Figure 4. When the bar 59 is raised in this way, the latch 63 (Fig. 3) operates to engage the shoulder 64 on collar 65, and this holds the bar up.

It will be noted that when the lever 47 is actuated it always actuates the lever 50 and hence, even in notching the fabric before commencing the measuring movement the pin 68 will move in such a way as to disengage the pawl 63 from the collar 65. This movement of the pin 68 however, does not permit the bar 59 to fall because such a falling movement of the bar will be prevented by the arm 80; in other words, when the indicating mechanism is in the zero position, the bar 59 cannot fall even if the detent pawl 63 is released.

When it is desired to measure a succession of remnants without the bar 59 being operated when the marking lever 50 is actuated, it is simply necessary to rotate the button or cam 83 into the upright position shown in Figure 4. When the button is in its other position indicated in the full lines in Figure 4 it does not interfere in any way with the operation of the bar 59.

While we have described the member 59 merely as a bar, by this term we mean any means which can operate to prevent use of the machine and we do not confine ourselves to any particular means or construction for this part.

It is understood that the embodiment of the invention described herein is only one of the many embodiments our invention may take, and we do not wish to be limited in the practice of our invention nor in our claims, to the particular embodiment set forth.

What we claim is:—

1. In a machine of the kind described, the combination of indicating mechanism, a marking device, a hand-operated member for actuating the marking device before the operation of the machine, a second hand-operated member for actuating the marking device after the operation of the machine, a bar for obstructing the feeding of cloth to the machine, means for holding said bar inoperative, means for releasing said holding means by the operation of said second named hand-operated member so as to allow the bar to become operative, zero-setting means for returning the indicating mechanism to zero, and means for withdrawing the obstruction bar from operation upon the return of the indicating mechanism to zero.

2. In a fabric measuring and cost computing machine, the combination of indicating mechanism for indicating the length of fabric measured, a measuring roller for actuating the same, a presser roller mounted to move toward or from the measuring roller and co-operating therewith in the measuring movement, a marking device, a hand-operated member for actuating the marking device to mark the fabric at the point where the measurement begins, a second hand-operated member for actuating the marking device after the measuring movement has taken place, a bar for obstructing the path of the fabric, means for holding said bar inoperative, means for releasing said holding means by the operation of said second named hand-operated member so as to allow the bar to become operative to obstruct the path of the fabric, zero-setting means for returning the indicating mechanism to zero after the measuring movement, and automatic means for withdrawing the obstruction bar from the path of the fabric upon the return of the indicating mechanism to zero.

3. In a fabric measuring and cost computing machine, the combination of indicating mechanism for indicating the length of the fabric measured, a measuring roller for actuating the same, a presser roller mounted to move toward or from the measuring roller and co-operating therewith in the measurement movement, a marking device, a hand-operated member for acuating the marking device to mark the fabric at the point where the measurement begins, a second hand-operated member for actuating the marking device after the measuring movement has taken place, a movable bar for obstructing the feeding of cloth to the machine, detent means for normally holding the bar out of the path of movement of the fabric, means actuated by the second hand-operated member for releasing the detent to permit the bar to advance and obstruct the path of the fabric, zero-setting means for returning the indicating mechanism to zero and means for withdrawing the bar from the path of the fabric upon the return of the indicating mechanism to zero.

4. In a fabric measuring and cost computing machine, the combination of indicating mechanism for indicating the length of the fabric measured, a measuring roller for actuating the same, a presser roller and frame therefor mounted to move toward or from the measuring roller, and co-operating therewith in the measuring movement, a marking device, a hand-operated member for actuating the marking device to mark the fabric at the point where the measurement begins, a second hand-operated member for actuating the marking device after the measuring movement has taken place, a movably mounted bar for obstructing the path of the fabric, detent means for holding the bar out of the path of the fabric, the said bar operating by gravity to descend into the path of the fabric when the detent is released, means for releasing the detent means, zero-setting means for returning the indicating mechanism to zero after the measuring movement, and means for withdrawing the bar from the path of the fabric upon the return of the indicating mechanism to zero and co-operating with the detent to enable the detent to hold the bar in its withdrawn position.

5. In a fabric measuring and cost computing machine, the combination of indicating mechanism, a measuring roller for actuating the same, a presser roller to co-operate with the measuring roller in the measuring movement, a movably mounted presser roller frame carrying the presser roller, a plurality of means co-operating therewith respectively to hold the presser roller raised away from the measuring roller or depressed against the measuring roller, a marking device, a hand-operated member for actuating the marking device before the measuring movement, a second hand-operated member for actuating the marking device to mark the fabric after the measuring movement, means actuated by the second named hand-operated means for raising the presser roller frame, and means co-operating with the first named hand-operated member to prevent the operation of said holding means whereby to leave the presser roller frame and the presser roller depressed after the operation of the first named hand-operated member.

6. In a fabric measuring and cost computing machine, the combination of indicating mechanism, a measuring roller for actuating the same, a presser roller to co-operate with the measuring roller in the measuring movement, a movably mounted presser roller frame carrying the presser roller, a latch for holding the presser roller frame raised with the presser roller away from the measuring roller to enable the fabric to be inserted between the rollers, a marking device, a hand-operated member for actuating the marking device to mark the fabric before beginning the measurement, a second hand-operated member for actuating the marking device to mark the fabric after the measuring movement and having means co-operating with a part of the same to raise the presser roller frame and enable the latch to hold it raised and means co-operating with the first named hand-operated member to hold said latch inoperative and thereby enable said first named hand-operated member to actuate the marking device without effecting the latching of the presser roller frame in its raised position.

7. In a fabric measuring and cost computing machine, the combination of a frame, indicating mechanism, a measuring roller for driving the indicating mechanism when the fabric is pulled past the measuring roller, a movable bar having a position in which it is withdrawn from the path of the fabric and having a second position in which it projects into the path of the fabric to prevent the feeding of cloth to the machine, marking means for marking the edge of the fabric at the point where it is to be cut off after the same has been measured, and means for controlling the bar from the marking means, and co-operating with the bar to cause it to assume a position in the path of the fabric after the marking means has been actuated.

8. In a fabric measuring and cost computing machine, the combination of a frame, indicating mechanism, a measuring roller for driving the indicating mechanism when the fabric is pulled past the measuring roller, a movable bar having a position in which it is withdrawn from the path of the fabric and having a second position in which it projects into the path of the fabric to prevent the feeding of cloth to the machine, marking means for marking the edge of the fabric at the point where it is to be cut off after the same has been measured, means for controlling the bar from the marking means and co-operating with the bar to cause the same to assume a position in the path of the fabric after the marking means has been actuated, zero-setting mechanism for returning the indicating mechanism to zero, and automatic means operating upon the return of the indicating mechanism to zero, to move the bar to its withdrawn position.

9. In a fabric measuring and cost computing machine, the combination of indicating mechanism, a measuring roller for driving the indicating mechanism when the fabric is pulled past the measuring roller, a pivotally mounted bar having a position in which it is withdrawn from the path of the fabric, a detent pawl for holding the bar in its withdrawn position, marking means for marking the edge of the fabric at the point where it is to be cut off after the same has been measured, and means for releasing the detent pawl when the marking device is actuated, thereby permitting the bar to move into the path of the fabric.

10. In a fabric measuring and cost computing machine, the combination of indicating mechanism, a measuring roller for driving the indicating mechanism when the fabric is pulled past the measuring roller, a pivotally mounted bar having a position in which it is withdrawn from the path of the fabric, a detent pawl for holding the bar in its withdrawn position, marking means for marking the edge of the fabric at the point where it is to be cut off after the same has been measured, means for releasing the detent pawl when the marking device is actuated, thereby permitting the bar to move into the path of the fabric, zero-setting mechanism for returning the indicating mechanism to zero and automatic means for returning the bar to its withdrawn position upon the return of the indicating mechanism to its zero position.

11. In a fabric measuring and cost computing machine, the combination of indicating mechanism, a measuring roller for driving the indicating mechanism when the fabric is pulled past the measuring roller, a pivotally mounted bar having a position in which it is withdrawn from the path of the fabric, a detent pawl for holding the bar in its withdrawn position, marking means for marking the edge of the fabric at the point where it is to be cut off after the same has been measured, and a pin carried by the marking means for engaging the detent pawl to release the same when the marking device is actuated, thereby permitting the bar to move into the path of the fabric.

12. In a fabric measuring and cost computing machine, the combination of indicating mechanism, a measuring roller for driving the indicating mechanism when the fabric is pulled past the measuring roller, a movably mounted bar having a position in which it lies withdrawn from the path of the fabric, and a second position in which it projects into the path of the fabric, a detent pawl for holding the bar in its withdrawn position, marking means for marking the edge of the fabric at the point where it is to be cut off after the same has been measured, means actuated by the marking device for releasing the detent pawl to permit the bar to move into the path of the fabric, a spring for zero-setting the indicating mechanism, a hand-operated member for starting the zero-setting movement, and means actuated by the indicating mechanism when it arrives at the zero position for moving the bar to its withdrawn position and co-operating with the detent pawl to enable the same to maintain the bar in such position.

13. In a fabric measuring and cost computing machine, the combination of indicating mechanism, a measuring roller for actuating the same, a presser roller to co-operate with the measuring roller in the measuring movement, a movably mounted presser roller frame carrying the presser roller, means co-operating therewith to hold the presser roller depressed against the measuring roller, a knife for marking the edge of the fabric, a hand-operated lever for actuating the knife before the measuring movement, a second lever for actuating the knife to mark the fabric after the measuring movement, means actuated by the uring movement, means actuated by the second named lever for raising the presser roller frame, a latch for latching the presser roller frame raised, said second named lever being movable independently of the first named lever, and having means whereby the movement of the first named lever will actuate the second named lever, said first named lever having means for inhibiting the said latch, whereby the operation of the first named lever leaves the presser roller depressed and against the measuring roller.

14. In a fabric measuring and cost computing machine, the combination of indicating mechanism, a measuring roller for actuating the same, a presser roller to co-operate with the measuring roller in the measuring movement, a movably mounted presser roller frame carrying the presser roller, means co-operating therewith to hold the presser roller depressed against the measuring roller, a knife for marking the edge of the fabric, a hand-operated lever for actuating the knife before the measuring movement, a second lever for actuating the knife to mark the fabric after the measuring movement, means actuated by the second named lever for raising the presser roller frame, and a latch for latching the presser roller frame raised, said second presser roller frame raised, said second named lever being movable independently of the first named lever, said levers having a common pivot, said second named lever having a projection engaged by the first named lever whereby the actuation of the first named lever operates the second named lever, and said first named lever having means for inhibiting the said latch whereby the operation of the first named lever leaves the presser roller depressed against the measuring roller.

15. In a fabric measuring and cost computing machine, the combination of indicating mechanism, a measuring roller for actuating the same, a presser roller to co-operate with the measuring roller in the measuring movement, a movably mounted presser roller frame carrying the presser roller, means co-operating therewith to hold the presser roller depressed against the measuring roller, a knife for marking the edge of the fabric, a hand-operated lever for actuating the knife before the measuring movement, a second lever for actuating the knife to mark the fabric after the measuring movement, means actuated by the second named lever for raising the presser roller frame, a latch for latching the presser roller frame raised, said second named lever being movable independently of the first named lever, said levers having a common pivot, said second named lever having a projection engaged by the first named lever whereby the actuation of the first named lever operates the second named lever, and said first named lever having means for inhibiting the said latch whereby the operation of the first named lever leaves the presser roller depressed against the measuring roller, and means for returning each of said levers to its normal raised position.

16. In a fabric measuring and cost computing machine, the combination of indicating mechanism, a measuring roller for actuating the same, a presser roller to co-operate with the measuring roller in the measuring movement, a movably mounted presser roller frame carrying the presser roller, means cooperating therewith to hold the presser roller depressed against the measuring roller, a knife for marking the edge of the fabric, a hand-operated lever for actuating the knife before the measuring movement, a second hand-operated lever for actuating the knife to mark the fabric after the measuring movement, means actuated by the second named lever for raising the presser roller frame, a latch for latching the presser roller frame raised, said second named lever being movable independently of the first named lever, and having a pin engaged by the first named lever whereby the actuation of the first named lever operates the second named lever, said first named lever having a cam for engaging and inhibiting the said latch whereby the operation of the first named lever leaves the presser roller depressed and against the measuring roller, a spring for returning the first named lever, and a spring for returning the second named lever.

17. In a fabric measuring and cost computing machine, the combination of indicating mechanism, a measuring roller for actuating the same, a presser roller to co-operate with the measuring roller in the measuring movement, a movably mounted presser roller frame carrying the presser roller, means co-operating therewith to hold the presser roller depressed against the measuring roller, a knife for marking the edge of the fabric, a hand-operated lever for actuating the knife before the measuring movement, a second hand-operated lever for actuating the knife to mark the fabric after the measuring movement, means actuated by the second named lever for raising the presser roller frame, a latch for latching the presser roller frame raised, said second named lever being movable independently of the first named lever, and having a pin engaged by the first named lever whereby the actuation of the first named lever operates the second named lever, said first named lever having a cam for engaging and inhibiting the said latch whereby the operation of the first named lever leaves the presser roller depressed and against the measuring roller, a spring for returning the first named lever, a spring for returning the second named lever, a movably mounted bar having a position in which it is withdrawn from the path of the fabric and a second position in which it projects into the path of the fabric, and means actuated by the second named lever for effecting a movement of the bar into the path of the fabric.

18. In a fabric measuring and cost computing machine, the combination of indicating mechanism, a measuring roller for actuating the same, a presser roller to co-operate with the measuring roller in the measuring movement, a movably mounted presser roller frame carrying the presser roller, means co-operating therewith to hold the presser roller depressed against the measuring roller, a knife for marking the edge of the fabric, a hand-operated lever for actuating the knife before the measuring movement, a second hand-operated lever for actuating the knife to mark the fabric after the measuring movement, means actuated by the second named lever for raising the presser roller frame, a latch for latching the presser roller frame raised, said second named lever being movable independently of the first named lever, and having a pin engaged by the first named lever whereby the actuation of the first named lever operates the second named lever, said first named lever having a cam for engaging and inhibiting the said latch whereby the operation of the first named lever leaves the presser roller depressed and against the measuring roller, a spring for returning the first named lever, a spring for returning the second named lever, a movably mounted bar having a position in which it is withdrawn from the path of the fabric and a second position in which it projects into the path of the fabric, means actuated by the second named lever for effecting a movement of the bar into the path of the fabric, zero-setting mechanism for returning the indicating mechanism to zero and means actuated by the indicating mechanism upon its return to zero for effecting the return of the bar to its withdrawn position.

19. In a machine of the kind described, the combination of indicating mechanism, a marking device, a hand-operated member for actuating the marking device before the operation of the machine, a second hand-operated member for actuating the marking device after the operation of the machine, a bar for obstructing the feeding of cloth to the machine means for holding said bar inoperative, means for releasing said holding means by the operation of said second named hand-operated member so as to allow the bar to become operative, zero-setting means for returning the indicating mechanism to zero, automatic means for withdrawing the obstruction bar from operation upon the return of the indicating mechanism to zero, and means constructed so as to be operated at will for preventing said bar from advancing into the operative position.

20. In a machine of the kind described, the combination of indicating mechanism, a bar for obstructing the feeding of cloth to the machine, zero-setting means for returning the indicating mechanism to zero, automatic means for advancing the bar to its operative position, automatic means for withdrawing the bar to an inoperative position upon the return of the indicating mechanism to zero, and means constructed so as to be operated at will to render the said bar inoperative.

21. In a machine of the kind described, the combination of indicating mechanism, a hand-operated marking device, a bar for obstructing the feeding of cloth to the machine, means for holding said bar inoperative, means for releasing said holding means by the operation of the marking device, zero-setting means for returning the indicating mechanism to zero, automatic means for withdrawing the bar from operation upon the return of the indicating mechanism to zero, and hand-actuated means for rendering the said bar inoperative to enable a succession of remnants to be measured without resetting the indicating mechanism to zero after each measurement.

22. In a machine of the kind described, the combination of indicating mechanism, a bar for obstructing the feeding of cloth to the machine, automatic means for effecting the advance of the bar to operative position after a measurement has been made, zero-setting means for returning the indicating mechanism to zero, automatic means for withdrawing the bar to an inoperative position upon the return of the indicating mechanism to zero, and hand-operated means for rendering the said bar inoperative at will to enable a succession of remnants to be measured without returning the indicating mechanism to zero.

In testimony whereof, they have hereunto set their hands.

G. CARLTON HOSCH.
JOHN L. WHEELER.